(12) United States Patent

Bellora et al.

(10) Patent No.: US 12,637,366 B1
(45) Date of Patent: May 26, 2026

(54) WATER TREATMENT APPARATUS

(71) Applicants: Marc Bellora, Lanesborough, MA (US); Mark M. Simon, Wilbraham, MA (US)

(72) Inventors: Marc Bellora, Lanesborough, MA (US); Mark M. Simon, Wilbraham, MA (US)

(73) Assignees: Marc Bellora, Lanesborough, MA (US); Mark M. Simon, Wilbraham, MA (US)

( * ) Notice: Subject to any disclaimer, the term of this patent is extended or adjusted under 35 U.S.C. 154(b) by 0 days.

(21) Appl. No.: 19/242,704

(22) Filed: Jun. 18, 2025

(51) Int. Cl.
*C02F 1/24* (2023.01)
*B03D 1/14* (2006.01)
*C02F 1/52* (2023.01)

(52) U.S. Cl.
CPC .............. *C02F 1/24* (2013.01); *B03D 1/1412* (2013.01); *B03D 1/1431* (2013.01); *C02F 1/52* (2013.01)

(58) Field of Classification Search
CPC . C02F 1/24; C02F 1/52; B03D 1/1412; B03D 1/1431

(Continued)

(56) References Cited

U.S. PATENT DOCUMENTS 3,015,621 A * 1/1962 Quast ...................... B03D 1/08
210/519
4,301,008 A 11/1981 Baffert et al.

(Continued)

FOREIGN PATENT DOCUMENTS

CN 1143826 C 3/2004
CN 2716334 Y 8/2005

(Continued)

OTHER PUBLICATIONS

"Lamor Weir Skimmer (LWS) systems" available online at: <https://www.lamor.com/technology/environmental-preparedness/oil-skimmingsystems/ weir-skimmer>, 2025, 8 pages.

(Continued)

*Primary Examiner* — Bobby Ramdhanie
*Assistant Examiner* — William Addison Geisbert
(74) *Attorney, Agent, or Firm* — Hamilton, Brook, Smith & Reynolds, P.C.

(57) ABSTRACT

A water treatment apparatus can include an influent water delivery arrangement for delivering influent water containing contaminants and dissolved air. An elongate process channel can float the contaminants with the dissolved air to separate the influent water into a layer of the contaminants floating over cleaned water. Separation of the influent water can initiate near the front region of the processing channel and progress moving downstream toward the rear region. A cleaned water outlet arrangement can be included and have at least two laterally spaced apart outlet conduits extending through the rear wall of the clarifying portion of the process chamber near the bottom wall. Each outlet conduit can have an elongate intake opening extending along a bottom of the outlet conduit facing the bottom wall for intaking cleaned water upwardly from the bottom wall into the outlet conduit. The cleaned water outlet arrangement can spread cleaned water intake into the at least two laterally spaced apart outlet conduits along a longitudinal length and a spaced apart lateral width for minimizing downward currents of the influent water within the process channel.

18 Claims, 13 Drawing Sheets

(58) Field of Classification Search
USPC ......................................................... 210/600
See application file for complete search history.

(56) References Cited

U.S. PATENT DOCUMENTS

| | | | |
|---|---|---|---|
| 5,538,631 | A * | 7/1996 | Yeh ...................... B03D 1/1493 |
| | | | 210/195.1 |
| 5,662,790 | A * | 9/1997 | Carlton .................... B03D 1/24 |
| | | | 209/733 |
| 6,921,478 | B2 * | 7/2005 | Lambert ................ B03D 1/082 |
| | | | 210/205 |
| 8,066,872 | B1 | 11/2011 | Partridge et al. |
| 9,422,168 | B2 * | 8/2016 | Mane ......................... C02F 1/24 |
| 9,809,464 | B2 | 11/2017 | Bryan |
| 12,116,290 | B2 | 10/2024 | Turner |
| 2012/0228232 | A1 | 9/2012 | Jensen et al. |
| 2018/0273414 | A1 | 9/2018 | Rice |
| 2018/0297877 | A1 | 10/2018 | Lee et al. |

FOREIGN PATENT DOCUMENTS

| | | |
|---|---|---|
| CN | 201071106 Y | 6/2008 |
| CN | 100497080 C | 6/2009 |
| CN | 101691249 B | 6/2011 |
| CN | 106477662 B | 6/2018 |
| CN | 207608441 U | 7/2018 |
| CN | 208151012 U | 11/2018 |
| CN | 111361684 A | 7/2020 |
| CN | 213202428 U | 5/2021 |
| CN | 113754133 B | 2/2023 |
| JP | 5247919 B1 | 7/2013 |
| KR | 10-0292426 B1 | 6/2001 |
| KR | 10-2002-0005181 A | 1/2002 |
| KR | 10-1280430 B1 | 7/2013 |
| KR | 10-1780582 B1 | 9/2017 |
| KR | 10-2125504 B1 | 6/2020 |

OTHER PUBLICATIONS

Elastec (Trademark) "Oceanskater" available online at: <https://www.elastec.com/products/oil-spill-skimmers/weir-oilskimmers/oceanskater/>, 2025, 6 pages.
Nguyen et al., "A case study of low pressure air flotation ferryboat for algae removal in Korean rivers and lakes." Journal of Industrial and Engineering Chemistry, vol. 69, 2019, pp. 32-38.
Spill Control, "Weir Skimmer 120,000 L/hr" available online at: <https://spillcontrol.co.nz/product/weir-skimmer-120-000-l-hr/>, 2025, 6 pages.

* cited by examiner

WATER TREATMENT APPARATUS

BACKGROUND

Dissolved air flotation is a method of treating water for removing undesirable organic or non-organic contaminants in the water including pollution, substances, particulates, organisms, plankton, cyanobacteria, algae, etc., by causing the contaminants to rise to the surface of the water for removal. The process can be slow, so that typically, chemicals are used in the process to achieve better and faster flotation of undesirable contaminants. However, in certain lakes, ponds, harbors and rivers, when treating the water to remove contaminants including plankton, cyanobacteria and algae, it may be environmentally undesirable to use chemicals in the process.

SUMMARY

The present disclosure provides a movable water treatment apparatus or barge that can effectively treat water to remove undesirable contaminants in a timely manner with or without using chemicals in the process. The water treatment apparatus can include an influent water delivery arrangement for delivering influent water containing contaminants and dissolved air. An elongate process channel can receive the influent water containing the contaminants and the dissolved air from the influent water delivery arrangement, for floating the contaminants with the dissolved air to separate the influent water into a layer of the contaminants floating over cleaned water. The process channel can have a clarifying portion with a front region with a front wall, a bottom wall, two opposing side walls and a rear region with a rear wall. Separation of the influent water can initiate near the front region of the clarifying portion of the processing channel and progress moving downstream toward the rear region. A cleaned water outlet arrangement can be included and have at least two laterally spaced apart outlet conduits extending through the rear wall of the clarifying portion of the process chamber near the bottom wall. Each outlet conduit can have an elongate intake opening extending along a bottom of the outlet conduit facing the bottom wall for intaking cleaned water upwardly from the bottom wall into the outlet conduit. The cleaned water outlet arrangement can spread cleaned water intake into the at least two laterally spaced apart outlet conduits along a longitudinal length and a spaced apart lateral width for minimizing downward currents of the influent water within the clarifying portion of the process channel.

In particular embodiments, the at least two laterally spaced apart outlet conduits can be at least four laterally spaced apart outlet conduits. Each outlet conduit can include an outtake opening extending through the rear wall of the clarifying portion of the process channel and having flow control for controlling flow of the cleaned water from the clarifying portion of the process channel. The outlet conduits can be configured for delivering the cleaned water from the clarifying portion of the process channel into a cleaned water reservoir. The cleaned water reservoir can have a discharge exit arrangement at a discharge height that is elevated in height relative to the outtake openings of the outlet conduits. At least one baffle assembly can be positioned within the clarifying portion of the process channel downstream from the influent water delivery arrangement. The at least one baffle assembly can include two elongate baffle members positioned horizontally at a midlevel height of the process channel and can extend in a lengthwise direction of the process channel. Each elongate baffle member can have an elongate horizontal surface for minimizing downward currents of the influent water in the clarifying portion of the process channel to allow the contaminants to readily float to the surface of the influent water. Each elongate baffle member can have an elongate upright surface extending along an edge of the elongate horizontal surface. Each elongate baffle member can extend from one side wall of the process channel to the opposite side wall at an angle with the elongate baffle members crossing each other in an X configuration for directing a midlevel height layer of influent water in a crossing manner while moving downstream in the process channel. In some embodiments, the at least one baffle assembly can comprise two baffle assemblies that are longitudinally spaced apart from each other within the process channel. A contaminant removal device can be included for removing floating contaminants from the process channel. The influent water delivery arrangement can include four delivery outlets positioned near the front wall and the bottom wall of the clarifying portion of the process channel. A first pair of the delivery outlets can face in opposite directions for delivering a first portion of the influent water laterally towards respective side walls, and a second pair of delivery outlets can be spaced apart from the first pair. The second pair of delivery outlets can face in opposite directions for delivering a second portion of the influent water laterally towards the respective side walls. The spaced apart first and second pairs of delivery outlets can laterally spread out the delivery of the influent water into the process channel in a spaced apart manner for minimizing downward currents of the influent water within the process channel to allow the contaminants to more readily float to the surface of the influent water with the aid of the dissolved air within the process channel in the front region. The front wall of the process channel can include an angled portion connected to the bottom wall for directing the influent water delivered to the front region of the process channel in upward and downstream directions.

The present disclosure can also provide a water treatment apparatus including an influent water delivery arrangement for delivering influent water containing contaminants and dissolved air. An elongate process channel can receive the influent water containing the contaminants and the dissolved air from the influent water delivery arrangement, for floating the contaminants with the dissolved air to separate the influent water into a layer of the contaminants floating over cleaned water. The process channel can have a clarifying portion with a front region with a front wall, a bottom wall, two opposing side walls and a rear region with a rear wall. Separation of the influent water can initiate near the front region of the clarifying portion of the process channel and progress moving downstream toward the rear region. At least one baffle assembly can be positioned within the process channel downstream from the influent water delivery arrangement. The at least one baffle assembly can include two elongate baffle members positioned horizontally at a midlevel height of the process channel that can extend in a lengthwise direction of the process channel. Each elongate baffle member can have an elongate horizontal surface for minimizing downward currents of the influent water in the process channel to allow the contaminants to readily float to the surface of the influent water. A cleaned water outlet arrangement can be included and have at least three laterally spaced apart outlet conduits extending through the rear wall of the clarifying portion of the process chamber near the bottom wall. Each outlet conduit can have an elongate intake opening extending along a bottom of the outlet conduit facing the bottom wall for intaking cleaned water upwardly from the bottom wall into the outlet conduit. The cleaned water outlet arrangement can spread cleaned water intake into the at least three laterally spaced apart outlet conduits along a longitudinal length and a spaced apart lateral width for minimizing downward currents of the influent water within the clarifying portion of the process channel. Each outlet conduit can include an outtake opening extending through the rear wall of the clarifying portion of the process channel and have flow control for controlling flow of the cleaned water from the clarifying portion of the process channel. The outlet conduits can deliver the cleaned water from the clarifying portion of the process channel into a cleaned water reservoir. The cleaned water reservoir can have a discharge exit arrangement at a discharge height that is elevated in height relative to the outtake openings of the outlet conduits.

The present disclosure can also provide a method of treating water with a water treatment apparatus including delivering influent water containing contaminants and dissolved air into an elongate process channel with an influent water delivery arrangement, and floating the contaminants with the dissolved air within the process channel to separate the influent water into a layer of the contaminants floating over cleaned water. The process channel can have a clarifying portion with a front region with a front wall, a bottom wall, two opposing side walls and a rear region with a rear wall. Separation of the influent water can initiate near the front region of the clarifying portion of the processing channel and progress moving downstream toward the rear region. The cleaned water can be removed from the clarifying portion of the process channel with a cleaned water outlet arrangement having at least two laterally spaced apart outlet conduits extending through the rear wall of the clarifying portion of the process chamber near the bottom wall. Each outlet conduit can have an elongate intake opening extending along a bottom of the outlet conduit facing the bottom wall for intaking cleaned water upwardly from the bottom wall into the outlet conduit. The cleaned water outlet arrangement can spread cleaned water intake into the at least two laterally spaced apart outlet conduits along a longitudinal length and a spaced apart lateral width for minimizing downward currents of the influent water within the clarifying portion of the process channel.

In particular embodiments, the at least two laterally spaced apart outlet conduits can be at least four laterally spaced apart outlet conduits. Each outlet conduit can include an outtake opening extending through the rear wall of the clarifying portion of the process channel and having flow control for controlling flow of the cleaned water from the clarifying portion of the process channel. The cleaned water can be delivered from the clarifying portion of the process channel into a cleaned water reservoir through the outlet conduits. The cleaned water reservoir can have a discharge exit arrangement at a discharge height that is elevated in height relative to the outtake openings of the outlet conduits for discharging the cleaned water from the cleaned water reservoir. Downward currents of the influent water in the clarifying portion of the process channel can be minimized to allow the contaminants to readily float to the surface of the influent water with at least one baffle assembly positioned within the clarifying portion of the process channel downstream from the influent water delivery arrangement. The at least one baffle assembly can include two elongate baffle members positioned horizontally at a midlevel height of the process channel and can extend in a lengthwise direction of the process channel. Each elongate baffle member can have an elongate horizontal surface. A midlevel height layer of influent water can be directed in a crossing manner while moving downstream in the clarifying portion of the process channel with an elongate upright surface of each elongate baffle member extending along an edge of the elongate horizontal surface. Each elongate baffle member can extend from one side wall of the process channel to the opposite side wall at an angle with the elongate baffle members crossing each other in an X configuration. In some embodiments, the at least one baffle assembly can comprise two baffle assemblies that are longitudinally spaced apart from each other within the process channel. Floating contaminants can be removed from the process channel with a contaminant removal device. The influent water can be delivered with the influent water delivery arrangement which can include four delivery outlets positioned near the front wall and the bottom wall in the front region of the clarifying portion of the process channel. A first pair of the delivery outlets can face in opposite directions for delivering a first portion of the influent water laterally towards respective side walls, and a second pair of delivery outlets can be spaced apart from the first pair. The second pair of delivery outlets can face in opposite directions for delivering a second portion of the influent water laterally towards the respective side walls. The spaced apart first and second pairs of delivery outlets can laterally spread out the delivery of the influent water into the process channel in a spaced apart manner for minimizing downward currents of the influent water within the process channel to allow the contaminants to more readily float to the surface of the influent water with the aid of the dissolved air within the clarifying portion of the process channel in the front region. The front wall of the process channel can include an angled portion connected to the bottom wall for directing the influent water delivered to the front region of the process channel in upward and downstream directions.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
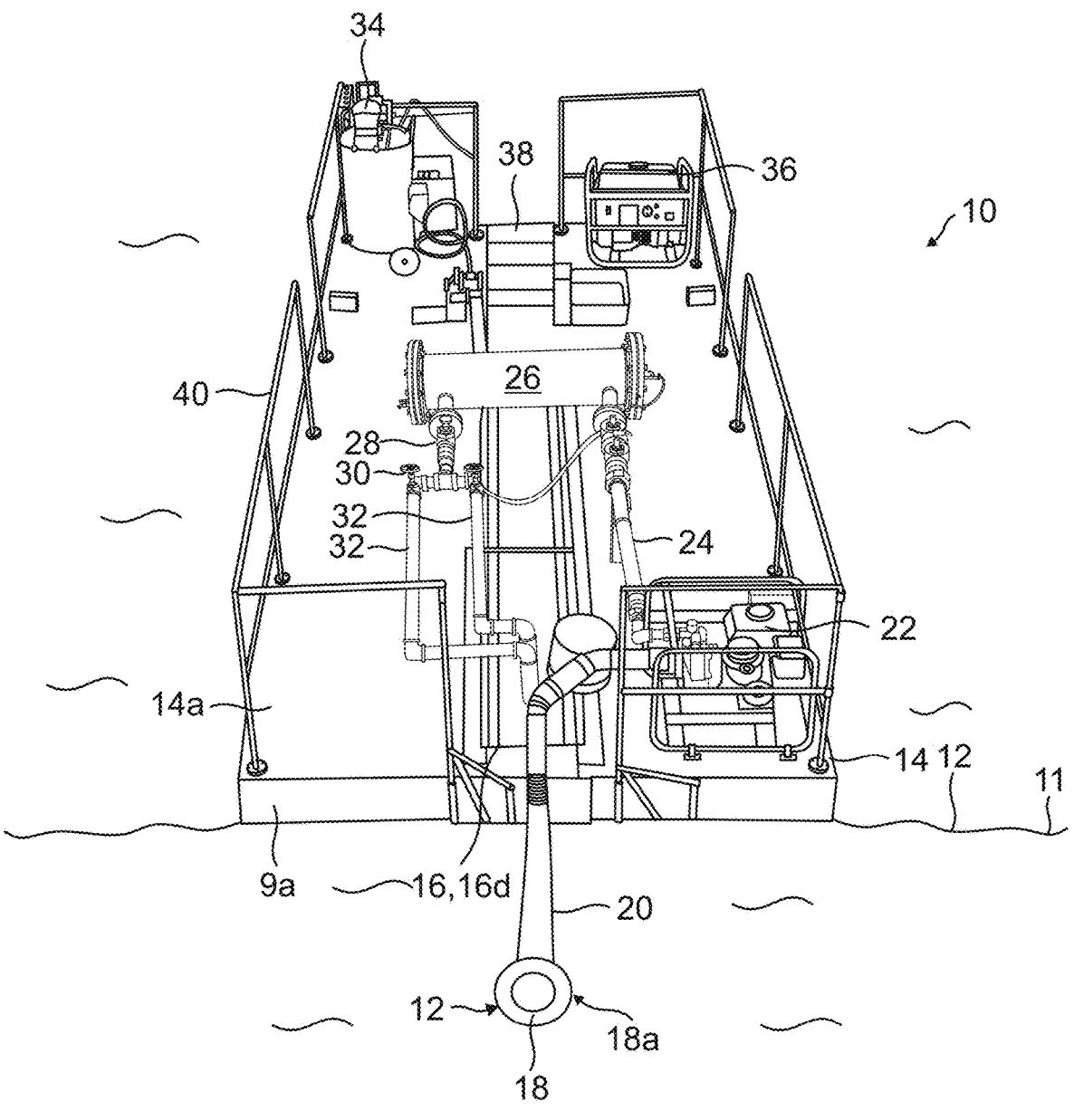
FIG. 1 is a perspective view of an embodiment of a water treatment apparatus, water craft or barge in the present disclosure.
Figure 2:
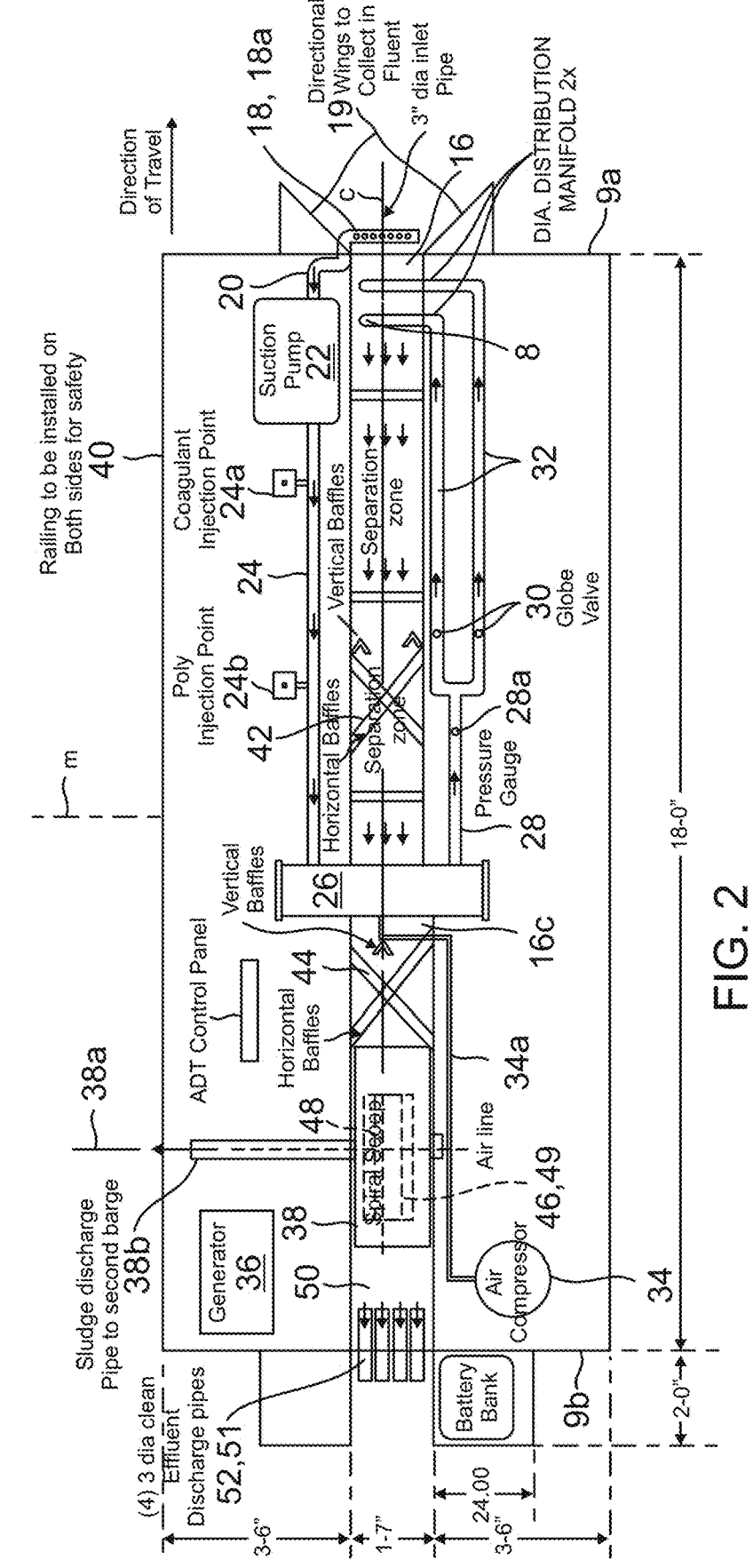
FIG. 2 is a top schematic view of an embodiment of a water treatment barge.
Figure 3:
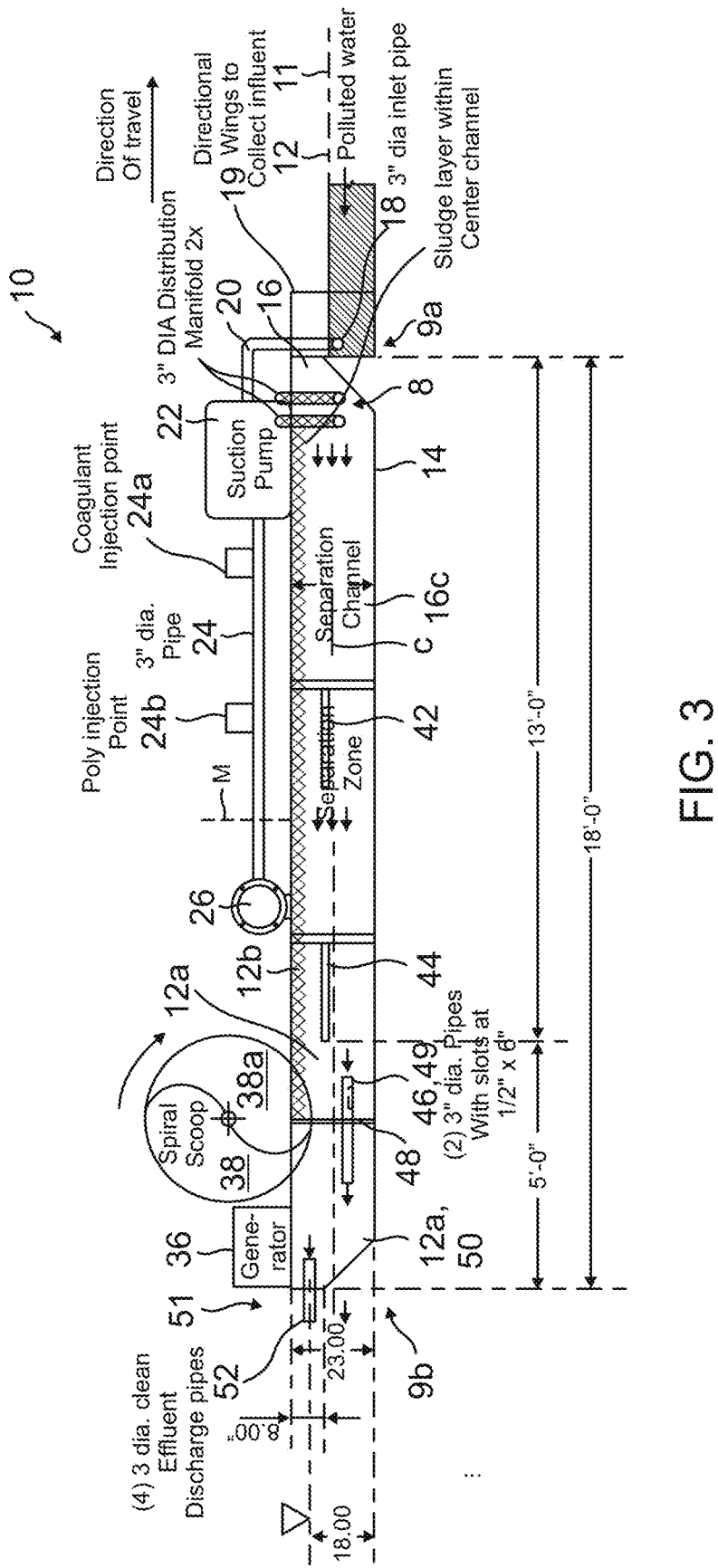
FIG. 3 is a side schematic view of an embodiment of a water treatment barge.
Figure 4:
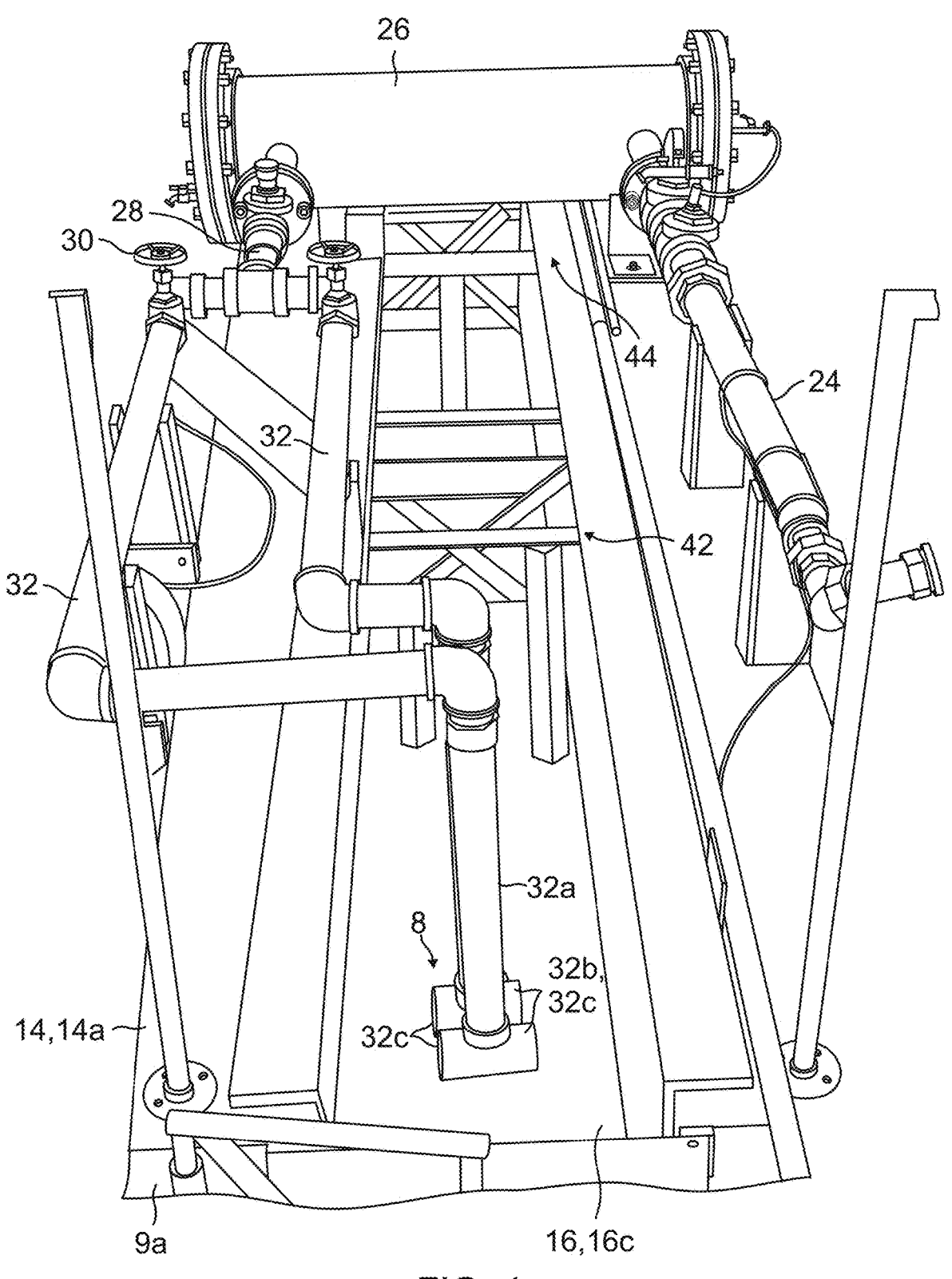
FIG. 4 is a perspective view of a front portion of an embodiment of a water treatment barge showing a process or treatment channel.
Figure 5:
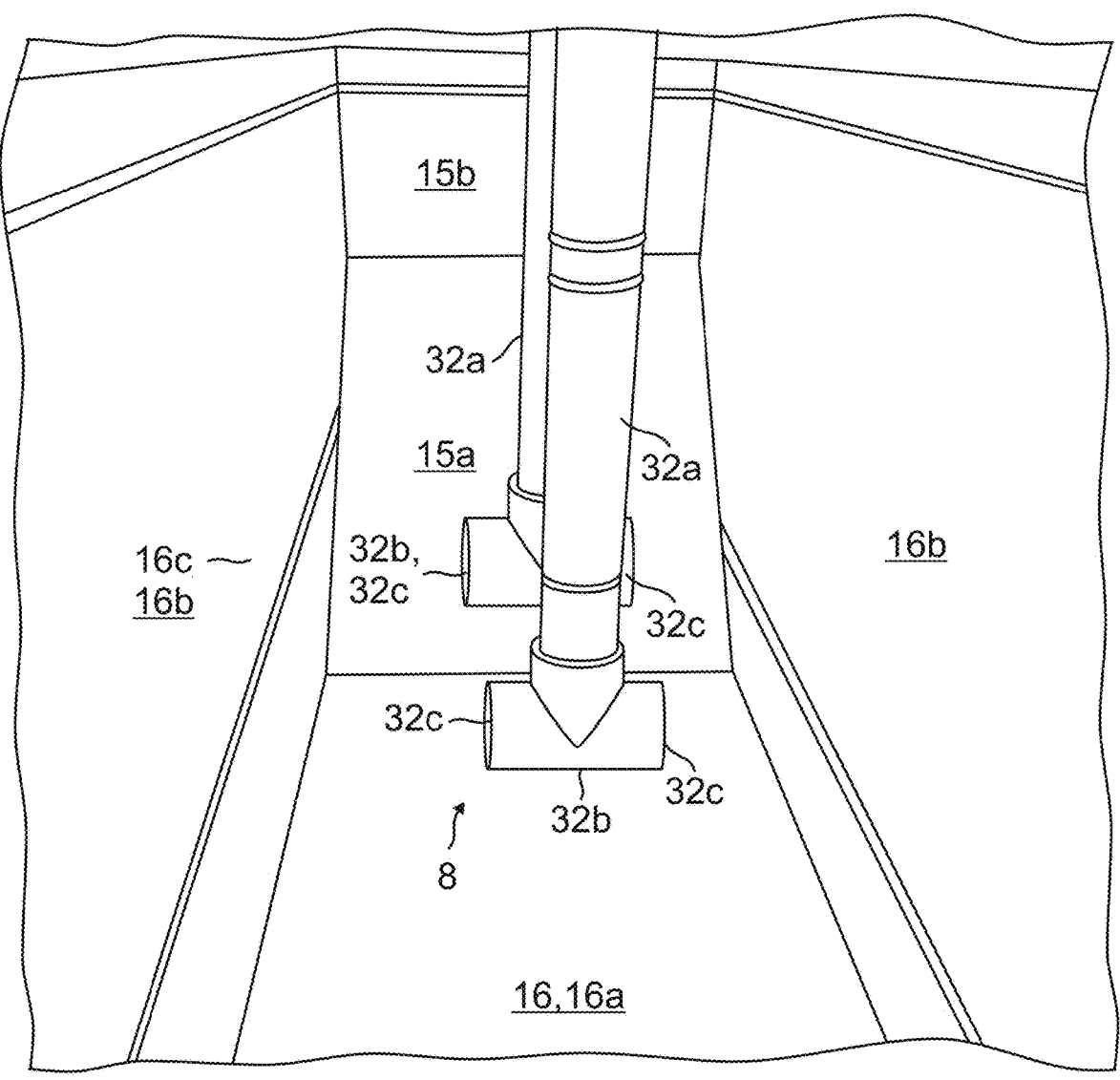
FIG. 5 is a perspective view of the front of an embodiment of the process channel.

Referring to FIGS. 1-3, embodiments of a movable water treatment, cleaning, clarifying or processing apparatus, water craft or barge 10 can float on water 12 of a water source 11 such as in a lake, pond, harbor, river, etc., for treating, clarifying, cleaning or processing the water 12 using dissolved air flotation. The water 12 may contain undesirable organic or non organic contaminants in the water including pollution, substances, particulates, organisms, plankton, cyanobacteria, algae, suspended and dissolved solids, etc., for removal by the water treatment barge 10. The water treatment barge 10 can include a hull 14 that can float within the water 12. The hull 14 can have a central water treatment, cleaning, clarifying, process or processing channel 16 extending therein along a central axis C (FIGS. 2 and 3) along the length of the hull 14 for processing the water 12. The process channel 16 can be isolated from the surrounding water 12. The process channel 16 can have a removable top cover 16d. The hull 14 can have a flat upper deck 14a extending on opposite sides of the processing channel 16 with safety railings 40 mounted to the deck 14a.

An influent water inlet 18 can be positioned in front of the bow 9a of water treatment barge 10 and process channel 16 for gathering, collecting, drawing or suctioning water 12 from the water source 11, for example from the top 6 in. or more of the water source 11, which can be 12-18 in. in some embodiments. One embodiment of the water inlet 18 can be seen in FIG. 1, where the water inlet 18 can have a single large inlet hole 18a into which the water 12 enters. Another embodiment of the water inlet 18 can be seen in FIGS. 2 and 3, where the water inlet 18 can have a series of small inlet holes 18a positioned along a length of pipe positioned between two angled directional wings 19 attached to the bow 9a. The water inlet 18 can be connected to a water supply conduit, tube or pipe 20 that is connected to a water suction pump 22 positioned on the deck 14a for pumping the water 12 (which will be now referred to as influent water 12) from the water source 11 and to an air dissolving tube, apparatus or device (ADT) 26 via a conduit, tube or pipe 24 connected therebetween.

An air compressor 34 can provide compressed air via an air line 34a to the air dissolving tube 26 for mixing the compressed air with the influent water 12 within the air dissolving tube 26. The air compressor 34 can be powered by an electric generator 36. The pump 22 can be powered by gas, or can be electric and powered by generator 36. The air dissolving tube 26 can be connected to a conduit, tube or pipe 28 that supplies the influent water 12 that is mixed with dissolved air to two influent water delivery conduits, tubes or pipes 32 through respective pressure reducing devices or valves 30 which can be globe valves, that split the flow of the influent water 12 into two separate parallel paths and form micro-bubbles 7 (FIG. 6) of dissolved air within the influent water 12. The two water delivery conduits 32 are connected to an influent water delivery arrangement 8 for delivering the influent water 12 and micro-bubbles 7 of dissolved air into the upstream end or front region of the clarifying portion 16c of the process channel 16. The micro-bubbles 7 of dissolved air can help separate the influent water 12 within the process channel 16 into a layer of contaminants 12b floating on top of or over cleaned, clarified, processed or treated water 12a. The micro-bubbles 7 can attach to contaminant particles or substances 12p creating buoyancy for the particles 12p causing the particles 12p to rise up through the influent water 12 to the surface of the influent water 12.

A contaminant removal device or apparatus 38 such as a rotating sludge scoop, can be positioned at or near the downstream end of the clarifying portion 16c of the process channel 16 for removing the layer of contaminants 12b floating over the cleaned water 12a. A cleaned water outlet arrangement 49 at the downstream end of the clarifying portion 16c of the process channel 16 can deliver cleaned water 12a to a cleaned water reservoir 50 of the process channel 16 before discharge through a discharge exit arrangement 51 back to the water source 11.

Particular embodiments and details are now described further. Referring to FIGS. 2 and 3, for certain contaminants 12b, it may be desirable to add certain flocculant additives to the incoming influent water 12 to aid in the flotation process of the contaminants 12b. For example, coagulants can be added at a coagulant injection point 24a along conduit 24 to bind contaminant particles 12p together to create larger agglomerated particles which can attach to more micro-bubbles 7 for flotation within process channel 16. In addition, polyelectrolyte (flocculant) can be also added at a poly injection point 24b along conduit 24 to bind contaminant particles 12p together.

However for certain water sources 11, it is not desirable to use flocculant additives due to the nature of the water source 11 and surrounding environment. For example, the water treatment barge 10 can be used to effectively remove contaminants 12b such as organisms, plankton, cyanobacteria and algae without the use of flocculant additives. The following description of water treatment barge 10 will be described using only dissolved air, without the use of flocculant additives and starting at the air dissolving tube 26. The air compressor 34 can supply the air dissolving tube 26 with 90 psi of pressurized air that mixes with the influent water 12, which then is delivered to the two influent delivery conduits 32 and pressure reducing valves 30. Conduit 28 can have a pressure gauge 28a for monitoring the pressure therein. Connecting the two influent delivery conduits 32 to conduit 28 where the conduit diameters can be the same size, can reduce the flow rate and pressure that is in the conduit 28 by half within each conduit 32 split off from conduit 28. The pressure in each conduit 32 can then drop through each pressure reducing valve 30 to about 7-10 psi while at the same time creating micro-bubbles 7 of about 20-50 microns in size or 30-50 microns in size.

Referring to FIGS. 2-7, the influent water delivery conduits 32 can be connected to respective vertical conduits, tubes or pipes 32a by elbows, and extend downwardly along vertical axes 33 into the front region and near the bottom or bottom wall 16a of the clarifying portion 16c of the process channel 16. The bottom of each vertical conduit 32a can be connected to a respective Tee 32b. Each Tee 32b can have two large opening delivery outlets 32c on opposite sides, with the two Tees 32b forming the influent water delivery arrangement 8 for delivering the influent water 12 and dissolved air into the process channel 16. The delivery outlets 32*c* of each Tee 32*b* can each face an opposite side wall 16*b* of the process channel 16 to direct influent water 12 and dissolved air in opposite directions along lateral or horizontal axes 35 perpendicularly towards the opposing side walls 16*b* of the process channel 16. The diameter of the delivery outlets 32*c* can be the same diameter of the delivery conduits 32 and vertical conduits 32*a*, thereby splitting and slowing the delivery of the influent water 12 and dissolved air again in half, providing a gentle delivery. In addition, the delivery outlets 32*c* of each Tee 32*b* can be spaced apart from each other in the longitudinal direction of the process channel 16, thereby longitudinally spreading out the gentle delivery of the influent water 12 and dissolved air in a laterally spaced apart manner in two or opposite directions, thereby preventing, reducing or minimizing turbulence and unwanted downward currents or eddies in the process channel 16 that could draw contaminant particles 12*p* downwardly toward the bottom wall 16*a*.

Figure 6:
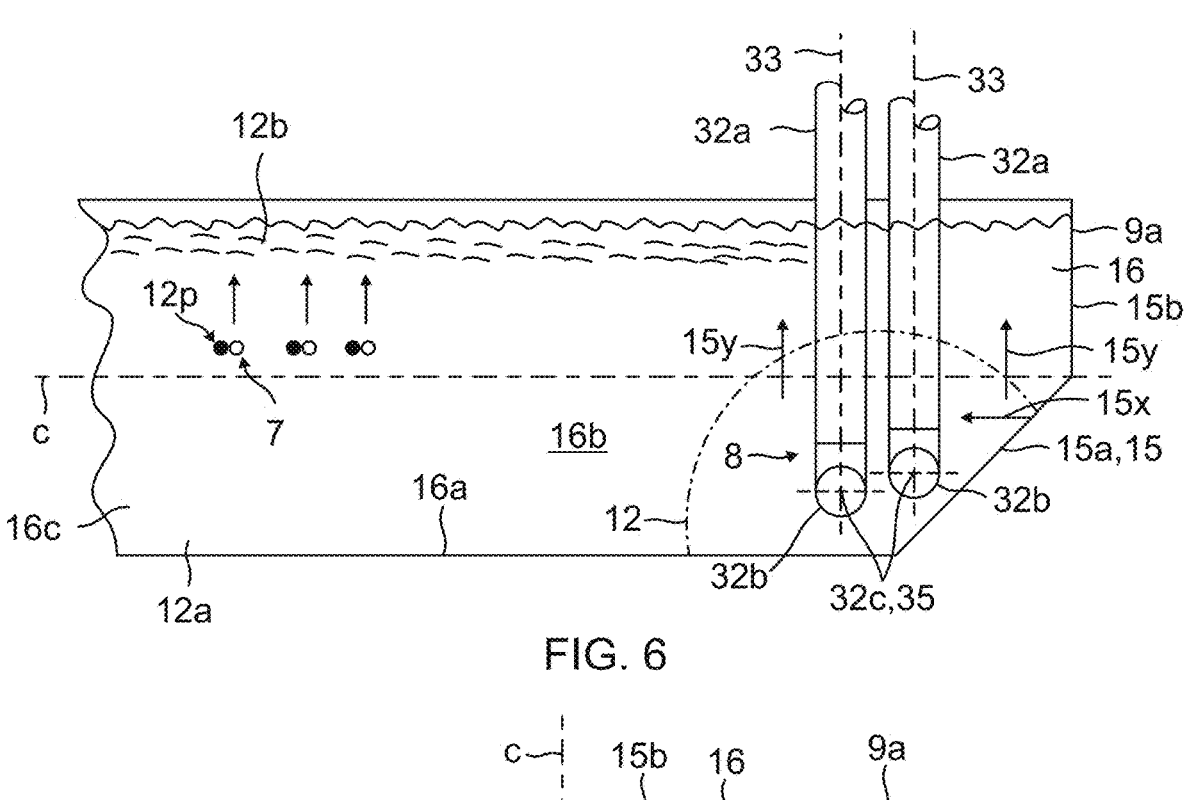
FIG. 6 is a side schematic view of the front of an embodiment of the process channel.
Figure 7:
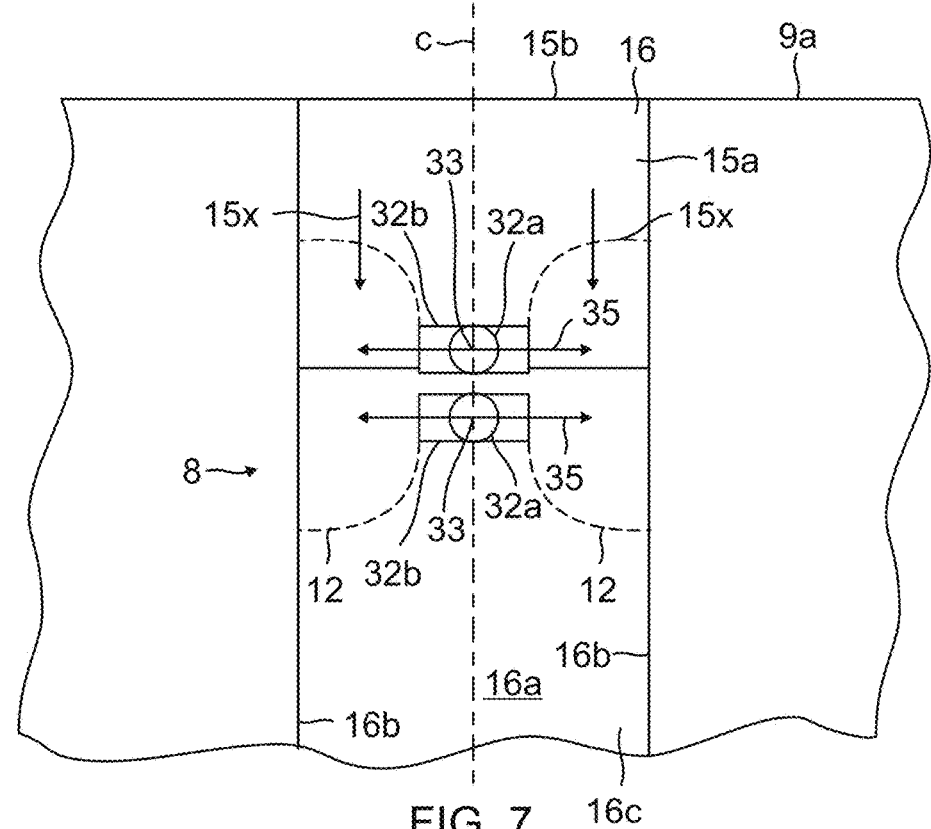
FIG. 7 is a top schematic view of the front of an embodiment of the process channel.
Figure 8:
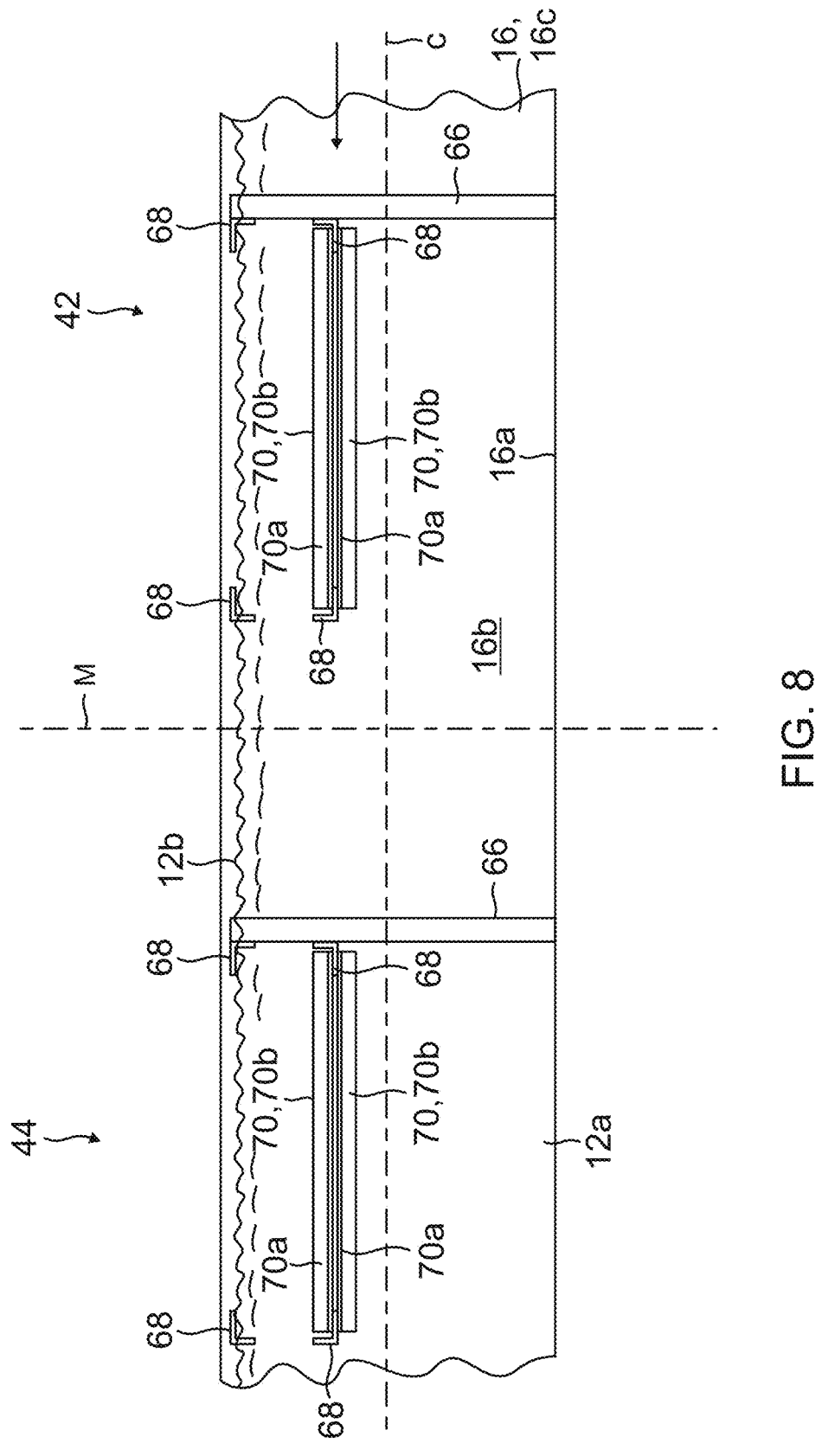
FIG. 8 is a side schematic view of the middle portion of an embodiment of the process channel.
Figure 9:
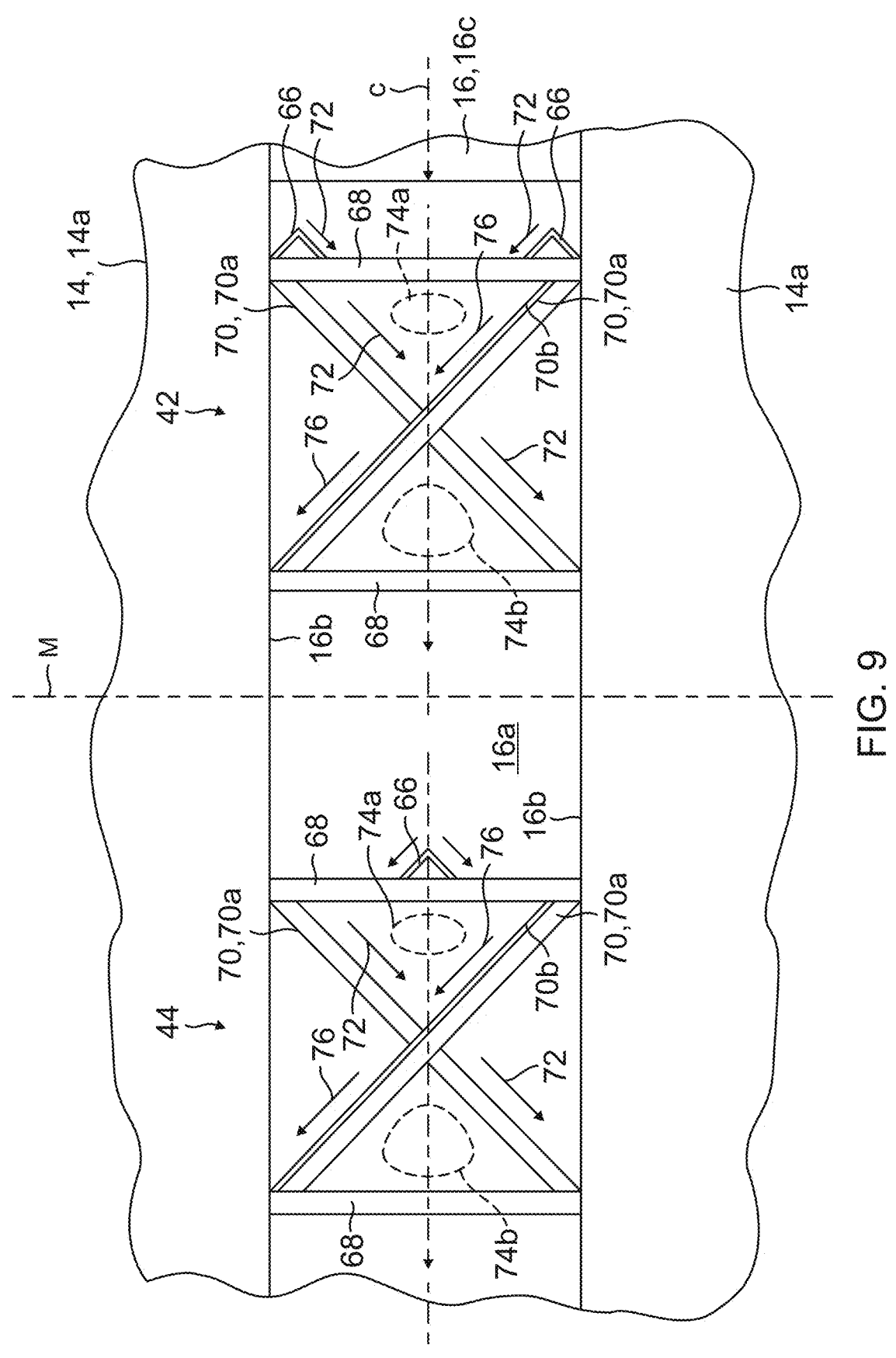
FIG. 9 is a top schematic view of the middle portion of an embodiment of the process channel.
Figure 10:
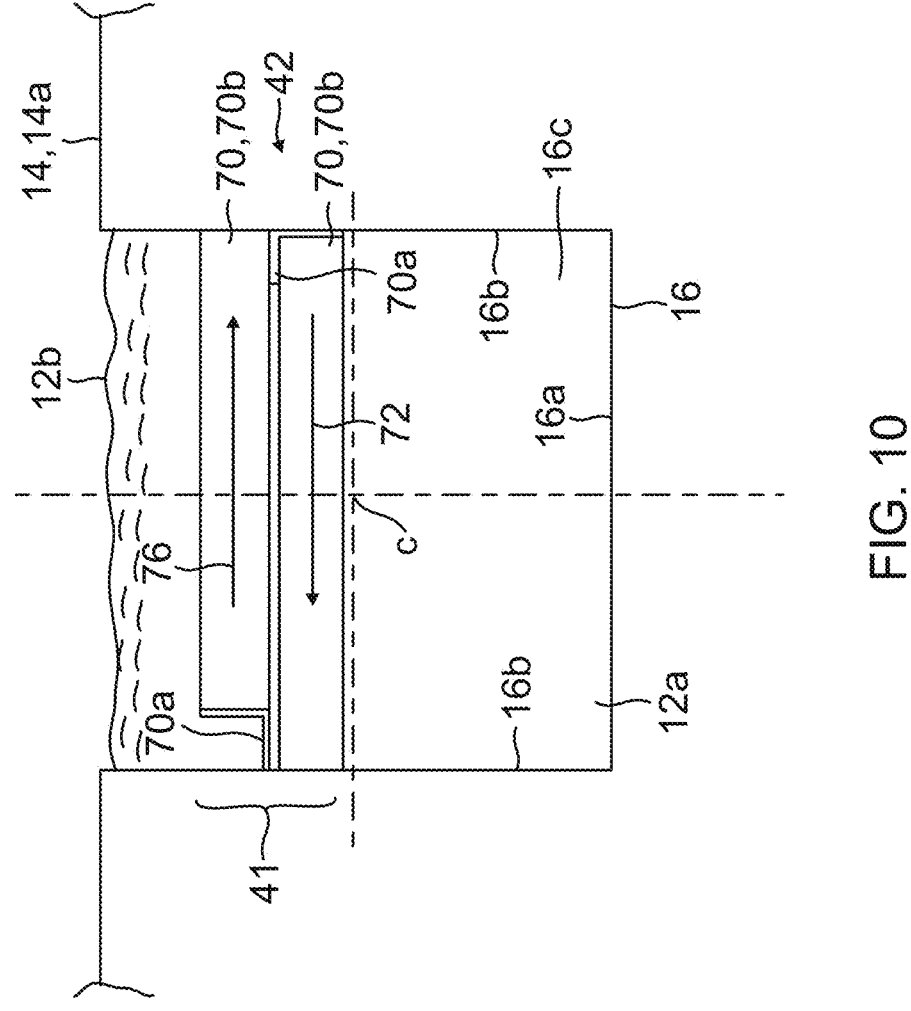
FIG. 10 is a front schematic view of an embodiment of a baffle portion in the process channel.
Figure 11:
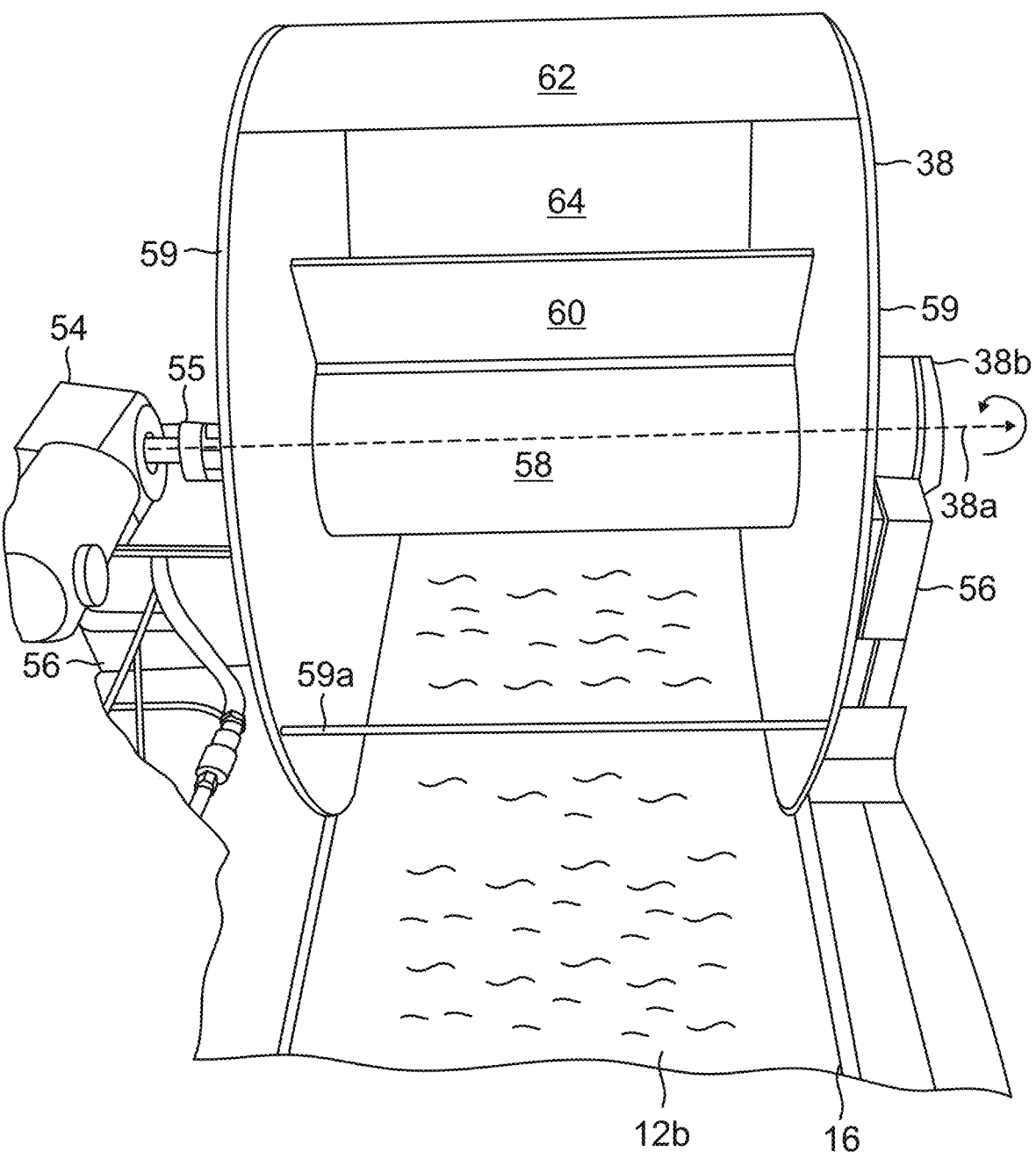
FIG. 11 is a front perspective view of an embodiment of a contaminant removal device or sludge scoop in the process channel.
Figure 12:
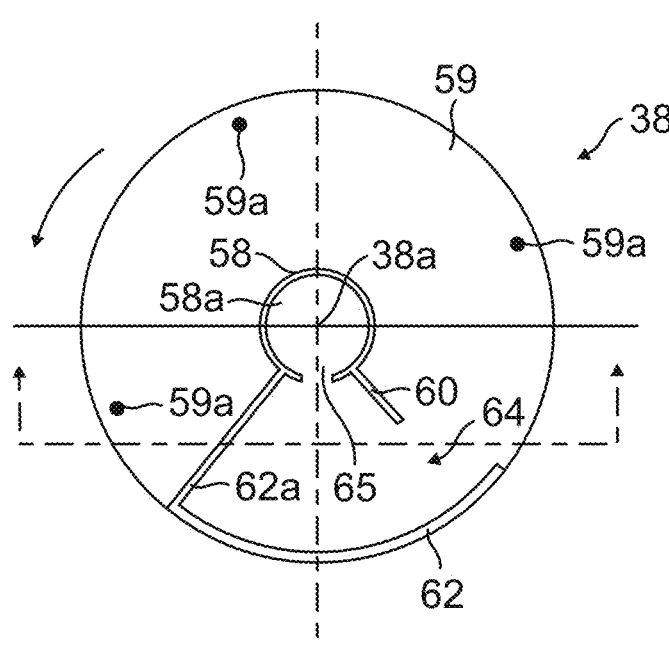
FIG. 12 is a side sectional view of an embodiment of a sludge scoop.
Figure 13:
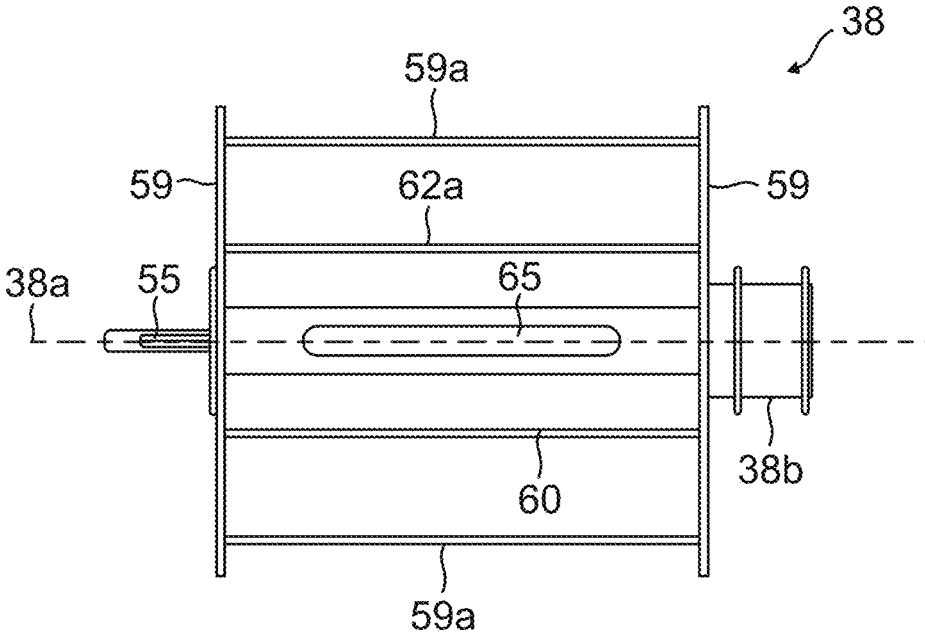
FIG. 13 is a sectional view thereof.

The front wall 15 of the process channel 16 can have a lower angled portion 15*a* connected to the bottom wall 16*a* of the process channel 16, and an upper vertical or upright portion 15*b* connected to the angled portion 15*a*. The lower angled portion 15*a* can be at a 45 degree angle for directing the influent water 12 and dissolved air delivered by the influent water delivery arrangement 8 to the front region of the process channel 16 both in upward 15*y* and rearward or downstream 15*x* directions. This can promote upward flotation of the contaminant particles 12*p*, downstream flow of the influent water 12, and also minimize downward currents of the influent water 12. Additionally, by directing the influent water 12 from the delivery outlets 32*c* near the bottom wall 16*a* of the process channel 16 and perpendicularly towards both side walls 16*b*, the bottom wall 16*a* and side walls 16*b* can also direct the flow of the influent water 12 in the upward 15*y* direction. The micro-bubbles 7 in the influent water 12 can bind, bond, adhere or attach to the contaminant particles 12*p*, creating greater buoyancy to the contaminant particles 12*p* to promote upward buoyant movement as seen in FIG. 6, which can be at about 12 inches per minute rise rate. The contaminant particles 12*p* can rise until reaching the surface of the influent water 12, forming a layer of contaminants 12*b* floating over cleaned water 12*a*. The bottom of the delivery outlets 32*c* can be positioned about 2-3 inches above the bottom wall 16*a* of the process channel 16 or the lower angled portion 15*a* of the front wall 15. The ends of the delivery outlets 32*c* can be positioned about 5-6 inches away from the side walls 16*b* of the process channel 16, and the lateral axes 35 can be perpendicular to the faces of side walls 16*b*.

Referring to FIGS. 2-4 and 8-10, a baffle assembly arrangement which can include one or more baffle assemblies 42 and 44, can be positioned within the clarifying portion 16*c* of the process channel 16 downstream from the influent water delivery arrangement 8. In one embodiment, two baffle assemblies 42 and 44 can be longitudinally or axially spaced apart from each other within process channel 16 and relative to central axis C. The first or upstream baffle assembly 42 can include two horizontally positioned or horizontal elongate baffle members 70 having an angle configuration or cross section, which are connected to a frame formed of lateral members 68 also having an angle configuration or cross section, that can structurally connect the side walls 16*b* of the process channel 16 together. The two horizontal baffle members 70 can each extend in a lengthwise direction of the process channel 16 at an angle with the baffle members 70 crossing each other, one on top of the other, in an X shaped configuration at or slightly above the central axis C of the process channel 16 at a midlevel height of the process channel 16. The angle configuration of each baffle member 70 provides an elongate horizontal baffle surface 70*a* and an elongate upright baffle surface 70*b* extending along an edge of the elongate horizontal surface 70*a* in a perpendicular manner. The elongate horizontal surfaces 70*a* of the two baffle members 70 can be positioned next to each other while crossing, so that the elongate upright surface 70*b* of the top baffle member 70 extends upwardly, and the elongate upright surface 70*b* of the bottom baffle member 70 extends downwardly. This can provide the baffle assembly 42 with crossing horizontal baffle surfaces 70*a* that extend at an angle in the lengthwise direction of the process channel 16 while also providing crossing upright baffle surfaces 70*b* that extend at an angle in the lengthwise direction of the process channel 16. Baffle assembly 42 can also have two vertically positioned or vertical elongate baffle members 66 having an angle configuration, which are connected to the upstream end of the horizontal baffle members 70 at or near the side walls 16*b* of the process channel 16, and extend about the height of the process channel. In some embodiments, the baffle members 70 can be formed of Tee shaped or curved profiles, configurations or cross sections instead of angle configurations.

The second or downstream baffle assembly 44 can be positioned within process channel 16 downstream and spaced apart from baffle assembly 42, and on an opposite side of the midpoint M of the length of the water treatment barge 10. The baffle assembly 44 can have a similar construction as baffle assembly 42, but the length and angle of the baffle members 70 can differ. In addition, the baffle assembly 44 can only have a single vertically positioned or vertical elongate baffle member 66, which can be positioned at the front of the baffle assembly 44 near the center or middle of the baffle assembly 44 and process channel 16.

In use, as the clarifying influent water 12 is travelling downstream within the clarifying portion 16*c* of the process channel 16 from the influent water delivery arrangement 8, and contaminant particles 12*p* attached to micro-bubbles 7 are rising upwardly to form a layer of the contaminants 12*b* floating over cleaned water 12*a*, the horizontal surfaces 70*a* of the baffle members 70 can provide enough horizontal surface area to continue to prevent or minimize downward currents at the midlevel height that could draw contaminant particles 12*p* toward the bottom wall 16*a*, while providing sufficient opening to continue to allow contaminant particles 12*p* to rise to the surface. The vertical baffle members 66 can provide desired flow resistance to slow downstream flow speed for allowing sufficient time for the contaminant particles 12*p* to rise to the surface. Having two baffle assemblies 42 and 44 positioned on opposite sides of the midpoint M of the length of the water treatment barge 10 can also minimize downward sloshing of the influent water 12 within the process channel 16 on opposite sides of the midpoint M caused by rocking of the water treatment barge 10 up and down about the midpoint M. In addition, as the influent water 12 moves downstream within process channel 16, the X shaped configuration of crossing angled elongate upright baffle surfaces 70*b* can direct a midlevel height layer of influent water 12 in a crossing manner as indicated by the arrows 72 and 76. This can laterally mix the midlevel height layer of influent water 12 to promote binding and/or rising of the micro-bubbles 7 and contaminant particles 12*p*. In addition, the X shaped crossing pattern of the influent water 12 in the direction of arrows 72 and 76 at the upstream region of baffle assemblies 42 and 44 can cause the influent water 12 to merge together to form a more concentrated region 74a of contaminant particles 12p at the midlevel height in the process channel 16, and also to diverge away to form a less concentrated region 74b of contaminant particles 12p at the midlevel height. Forming regions 74a and 74b can promote rising of the contaminant particles 12p with the micro-bubbles 7. Having two baffle assemblies 42 and 44 can prevent or reduce downward currents and provide horizontal stability of the influent water 12 along an extended length of the process channel 16 while at the same time promoting upward rise of the contaminant particles 12p to the surface.

Referring to FIGS. 1-3 and 11-13, the contaminant removal device or sludge scoop 38 can be adjustably positioned over the process channel 16 at or near the end of the clarifying portion 16c for removing the layer of contaminants 12b floating over the cleaned water 12a. The contaminant removal device 38 can be a rotating scoop that can be supported about a central drive shaft 55 along axis 38a, that is driven by a motor 54. The drive shaft 55 can be supported by two spacers or supports 56 that can adjust the height of the contaminant removal device 38 to accommodate different influent water 12 heights and contaminant 12b layer thicknesses. The contaminant removal device 38 can be rotated as indicated in the direction of the arrows which can be in the same direction of the flow of the influent water 12. The contaminant removal device 38 can have two circular sides 59 that are connected to opposite sides of a curved scoop member 62. The scoop member 62 can have about an 90 degree arc length and be connected to a rear wall 62a. The rear wall 62a can be connected to a central hollow exit tube 58 having an entrance opening or slot 65. A short wall or lip 60 can extend from the central exit tube 58 about 80 degrees relative to rear wall 62a, forming an interior scoop region 64 within the contaminant removal device 38. The scoop member 62, the rear wall 62a, the lip 60, and three structural support members or rods 59a are positioned between the two sides 59. As the scoop 62 is rotated by motor 54, contaminants 12b floating on the cleaned water 12a are scooped into the interior scoop region 64, and the lip 60 prevents the contaminants 12b from falling out of the interior scoop region 64 as the scoop 62 moves or rotates beyond 180 degrees from the initial scooping location of the contaminants 12b. The contaminants 12b enter the central exit tube 58 through slot 65 and exit the contaminant removal device 38 through exit conduit, tube or pipe 38b to a desired receptacle either on the water treatment barge 10, a separate barge, or on land. The axis 38a can be at a slight downward angle in the direction of pipe 38a for tilting the pipe 38a to allow the contaminants 12b to more easily be removed.

Referring to FIGS. 2, 3, 14 and 15, the downstream end of the clarifying portion 16c of the process channel 16 can have a rear or downstream barrier wall or dam 48 for containing the downstream flow of influent water 12. This can stop the downstream flow of the layer of contaminants 12b floating over the cleaned water 12a, to allow the contaminant removal device 38 to remove the contaminants 12b that have been contained by wall 48. The cleaned water 12a located at the bottom of the downstream end of the clarifying portion 16c of the process channel 16 can be the most clarified, since this is the region of the process channel 16 where the cleaned water 12a occupying this region has travelled the length of the clarifying portion 16c of the process channel 16 and has the longest residence time in the clarifying portion 16c for allowing the contaminant particles

Figure 14:
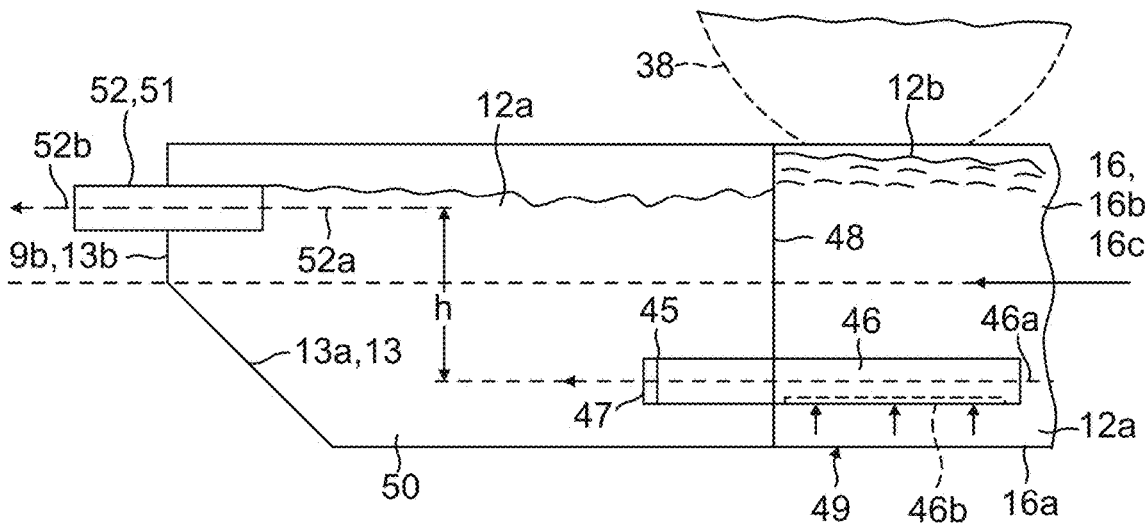
FIG. 14 is a side schematic view of the back of an embodiment of the barge.
Figure 15:
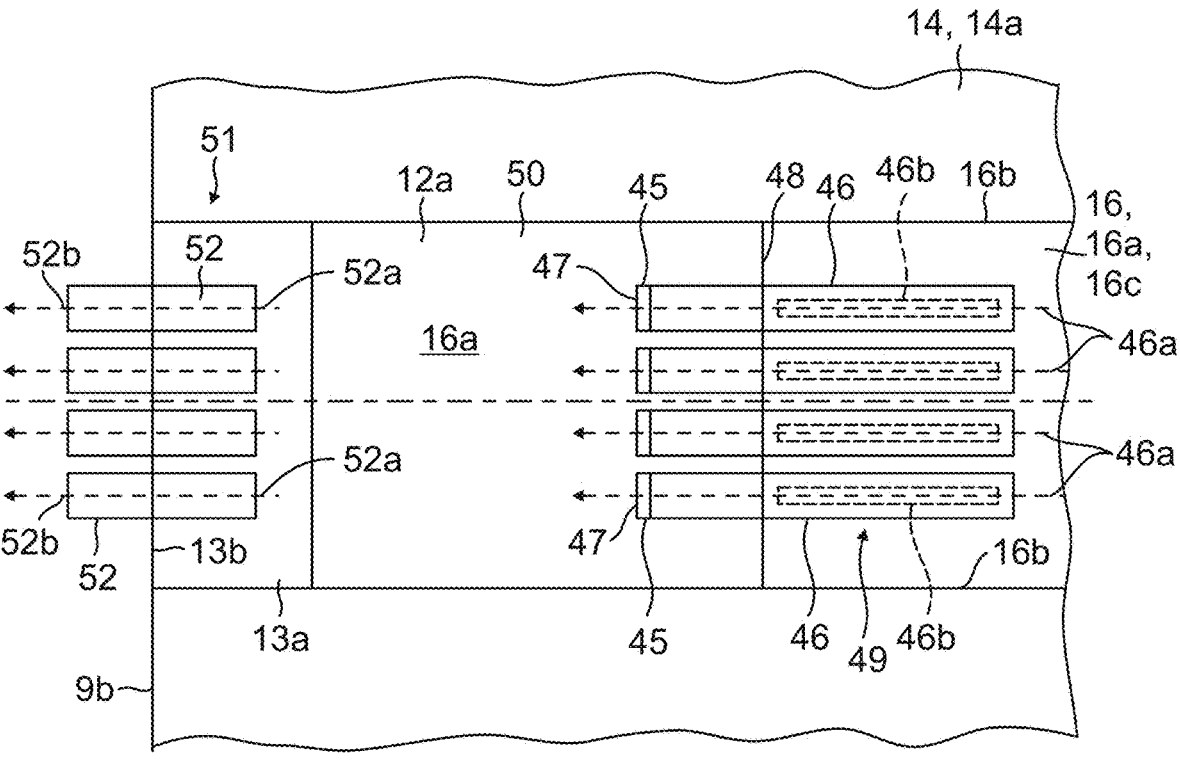
FIG. 15 is a top schematic view of the back of an embodiment of the barge.

12p to rise to the surface to form the layer of contaminants 12b over the cleaned water 12a. A cleaned water outlet arrangement 49 can be mounted to and extend through or past the barrier wall 48 for intaking cleaned water 12a from the bottom downstream end of the clarifying portion 16c of the process channel 16 and delivering the cleaned water 12a downstream to a cleaned water reservoir, tank or channel 50. The cleaned water reservoir 50 can be aligned with the clarifying portion 16c of the process channel 16 along central axis C, and can be considered a downstream portion of process channel 16, with the portion upstream of the barrier wall 48 being the clarifying portion 16c, and the portion downstream of the barrier wall 48 being the cleaned water 12a reservoir 50. The cleaned water outlet arrangement 49 can include two or more outlet conduits, tubes or pipes 46 positioned through the barrier wall 48 side by side in a laterally spaced about manner along respective parallel lateral axes 46a, above the bottom wall 16a by about 1-3 inches. The upstream end of each outlet conduit 46 can be sealed. The bottom of the outlet conduits 46 can have an elongate intake opening or slot 46b facing the bottom wall 16a, that can be ½ inch wide by 6-12 inches long, for intaking cleaned water 12a upwardly from the bottom wall 16a of the clarifying portion 16c of the process channel 16 along an elongate intake length. Each outlet conduit 46 can also have an adjustable flow control valve 45 and an outtake opening 47 downstream from the barrier wall 48 for delivering the cleaned water 12a to the bottom of the cleaned water reservoir 50. In some embodiments, the cleaned water outlet arrangement 49 can have three or more outlet conduits 46, for example four as shown in the figures. As a result, as seen in FIGS. 14 and 15, the cleaned water outlet arrangement 49 can gently intake cleaned water 12a upwardly from the bottom wall 16a along a longitudinal length of multiple spaced apart elongate intake openings 46b that are spaced apart laterally from each other, thereby creating a large spread out surface area intake region having a large longitudinal length and large lateral width. The large surface area intake region allows the cleaned water 12a to enter the multiple outlet openings 46b upwardly at a slow speed, thereby preventing or minimizing turbulence and the formation of downward currents in the influent water 12 that might draw contaminant particles 12p downwardly into the intake openings 46b.

By having the influent water delivery arrangement 8, the baffle assemblies 42 and 44, and the cleaned water outlet arrangement 49 all operating in a manner that prevents or minimizes downward water currents within the clarifying portion 16c of the process channel 16, there is little or no waterborne downward movement of contaminant particles 12p, so that upward flotation or rise speed of contaminant particles 12p bound to micro-bubbles 7 can be maximized, resulting in faster and more thorough separation of the layer of contaminants 12b and the cleaned water 12a.

The cleaned water reservoir 50 can be at the stem 9b of the water treatment barge 10, and can be about 20-25% of the length and capacity of the process channel 16, with the clarifying portion 16c being about 75-80% of the length and capacity. The cleaned water reservoir 50 can have a downstream discharge exit arrangement 51 for discharging the cleaned water 12a from process channel 16. The discharge exit arrangement 51 can include a series of two or more, or three or more, such as four discharge conduits, tubes or pipes 52 positioned laterally spaced apart side by side along respective longitudinal axes 52a for discharge from openings 52b. The discharge exit arrangement 51 can be positioned above the central axis C, where the axes 52a of the discharge conduits 52 are at a height h above the axes 46*a* of the outlet conduits 46 of the cleaned water outlet arrangement 49, which is positioned below the central axis C. This results in forming a large enough quantity of cleaned water 12*a* within the cleaned water reservoir to create hydraulic resistance to the outtake openings 47 of the outlet conduits 46 to ensure a consistent slow delivery of cleaned water 12*a* from the outtake openings 47 into the cleaned water reservoir 50. The elevated height of the conduits 52 of the discharge exit arrangement 51 relative to the outlet conduits 46 of the cleaned water outlet arrangement 49 can also prevent back flow from the water source 11 into the process channel 16 and the clarifying portion 16*c*. The stern 9*b* of water treatment barge 10 can have a rear wall 13 of the process channel 16 having a lower angled portion 13*a* connected to the bottom wall 16*a* of the process channel 16, and an upper vertical or upright portion 13*b* connected to the angled portion 13*a*. The discharge conduits 52 can extend through the upright portion 13*b*. The lower angled portion 13*a* can be at a 45 degree angle for directing the cleaned water 12 exiting the outlet conduits 46 upwardly towards the discharge conduits 52.

In one embodiment, water treatment barge 10 and the process channel 16 can be about 18 ft. long, and the width of the barge 10 can be about 8 ft, 5½ inches. The process channel can be about 17-18 in. wide and about 23-24 in. high. The clarifying portion 16*c* of the process channel 16 can be about 13 ft. long, and the cleaned water reservoir 50 can be about 5 ft. long. The bottom facing intake openings 46*b* of the outlet conduits 46 can be about 12 in. long, and can be positioned above the bottom wall 16*a* about 6 in. or lower, such as about 2, 3, 4 or 5 in. above the bottom wall 16*a*. The intake area of the outlet conduits 46 can be over a collective area about 12 in. long in the longitudinal direction and about 16 in. wide in the lateral direction, which can be almost the full width of the process channel 16. The axes 52*a* of conduits 52 can be positioned about 18 in. above the bottom wall 16*a* of process channel 16. The diameter of the conduits 20, 24, 32, 46 and 52, and Tees 32*b* can be 2-4 in. in diameter, or can be 3 in. in diameter. The water suction pump 22 can continuously provide 125 gal/min. of influent water 12 into the process channel 16. The processing or residence time of a particular or given discrete volume, segment, portion, quantity of influent water 12 entering the process channel 16 and exiting the cleaned water reservoir 50 as cleaned water 12*a* can be 4-5 min. This is much faster than prior art dissolved air flotation separation systems which typically have a residence time of 15-45 min. within a processing chamber or channel. The residence time of a discrete volume of influent water 12 within the clarifying portion 16*c* of the process channel 16 can be about 3-4 min., and the residence time of the resulting cleaned water 12*a* from this discrete volume within the cleaned water reservoir 50 can be 1 min. or less before exiting the discharge exit arrangement 51. The amount of total suspended solids that can be removed from the influent water 12 using only dissolved air can range from about 50% to 88%, depending upon the type of contaminant particles 12*p* being removed, and the speed at which the influent water 12 is being moved through the process channel 16. In other embodiments, it is understood that the size and capacity of the water treatment barge 10 can be varied or increased to vary or increase the water treatment capacity. For example, the size and capacity of the process channel 16, hull 14, water suction pump 22, conduits 24, 32, 46, 52, and Tees 32*b* can be increased, for example double the size and capacity or greater. In some embodiments, the depth or height of the process channel 16 can be increased, for example 23-36 in. or 24-48 in., depending upon the length of the clarifying portion 16*c* of the process channel 16. The water treatment barge 10 can be self propelled and operated to move around in a water source 11, remotely or piloted, or can be stationary.

Figure 16:
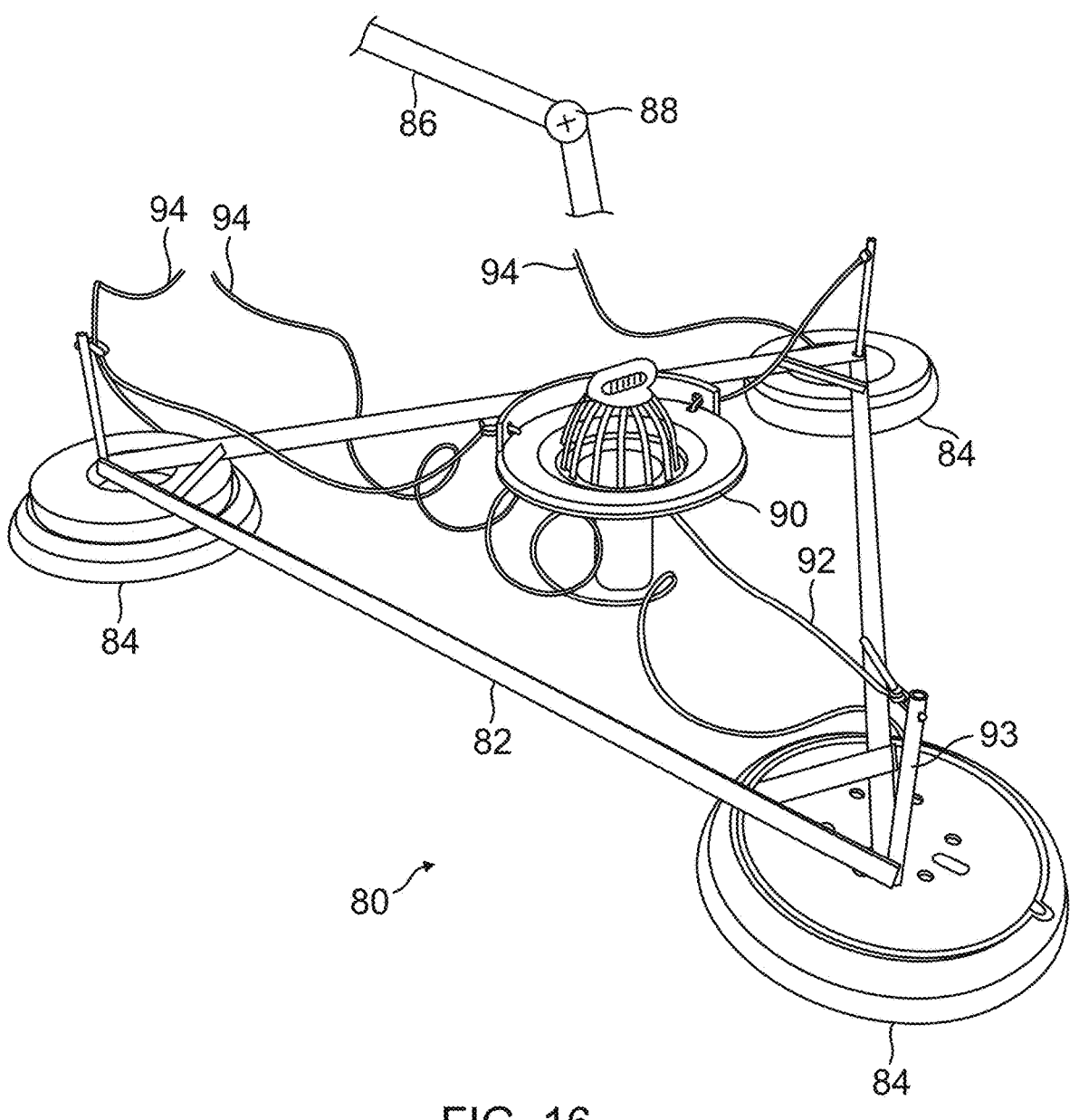
FIG. 16 is a perspective view of another embodiment of an influent water inlet assembly.

Referring to FIG. 16, influent water inlet 18 can be replaced by influent water inlet assembly 80, which can have an inlet assembly 90 having a circular inlet bowl, with a debris grate, and a rear upright circular arc wall segment for directing influent water 12 passing over the inlet bowl back into the inlet bowl. The arc wall segment can extend about 120 degrees and can be about 2-4 in. high. The inlet assembly 90 can be secured to a triangular support frame 82 by support assemblies, which can include upright members 93 and lateral members or lines 92. The three corners of the support frame 82 can be connected to three respective inflatable floats 84 which can be controllably inflated or deflated by respective air lines 94 connected thereto for raising or lowering the level of the inlet assembly 90 within the water 12. The support frame 82 can be secured to the hull 14 of the water treatment barge 10 by a support arm 86, which can have a joint 88 for positioning or moving the support frame 82 and inlet assembly 90 into the desired location or position relative to hull 14.

While example embodiments have been particularly shown and described, it will be understood by those skilled in the art that various changes in form and details may be made therein without departing from the scope of the embodiments encompassed by the appended claims. It is understood that various sizes, dimensions, capacities and geometries can vary depending upon the situation at hand. For example, the side walls 16*b* and bottom 16*a* of the process channel 16 can be angled or curved.

What is claimed is:

1. A water treatment apparatus comprising:
   an influent water delivery arrangement for delivering influent water containing contaminants and dissolved air;
   an elongate process channel for receiving the influent water containing the contaminants and the dissolved air from the influent water delivery arrangement, for floating the contaminants with the dissolved air to separate the influent water into a layer of the contaminants floating over cleaned water, the process channel extending along a horizontal longitudinal central axis and having a clarifying portion with a front region with a front wall, a bottom wall, two opposing side walls and a rear region with a rear wall, separation of the influent water initiating near the front region of the clarifying portion of the process channel and progressing moving downstream toward the rear region, at least one baffle assembly positioned within the clarifying portion of the process channel downstream from the influent water delivery arrangement, the at least one baffle assembly comprising two elongate baffle members positioned horizontally at a midlevel height of the process channel above the central axis and extending at angles from opposite side walls in a lengthwise direction of the process channel and the central axis crossing each other in a horizontal X configuration, each elongate baffle member having an elongate horizontal surface for minimizing downward currents of the influent water in the clarifying portion of the process channel to allow the contaminants to readily float to the surface of the influent water; and
   a cleaned water outlet arrangement comprising at least two laterally spaced apart outlet conduits extending through the rear wall of the clarifying portion of the process channel near the bottom wall, each outlet conduit having an elongate intake opening extending along a bottom of the outlet conduit facing the bottom wall for intaking cleaned water upwardly from the bottom wall into the outlet conduit, the cleaned water outlet arrangement spreading cleaned water intake into the at least two laterally spaced apart outlet conduits along a longitudinal length and a spaced apart lateral width for minimizing downward currents of the influent water within the clarifying portion of the process channel.

2. The water treatment apparatus of claim 1 in which the at least two laterally spaced apart outlet conduits comprise at least four laterally spaced apart outlet conduits.

3. The water treatment apparatus of claim 1 in which each outlet conduit includes an outtake opening extending through the rear wall of the clarifying portion of the process channel and having flow control for controlling flow of the cleaned water from the clarifying portion of the process channel.

4. The water treatment apparatus of claim 3 in which the outlet conduits are configured for delivering the cleaned water from the clarifying portion of the process channel into a cleaned water reservoir, the cleaned water reservoir having a discharge exit arrangement at a discharge height that is elevated in height relative to the outtake openings of the outlet conduits.

5. The water treatment apparatus of claim 1 in which each elongate baffle member has an elongate upright surface extending along an edge of the elongate horizontal surface for directing a midlevel height layer of influent water in a crossing manner while moving downstream in the process channel.

6. The water treatment apparatus of claim 5 in which the at least one baffle assembly comprises two baffle assemblies that are longitudinally spaced apart from each other within the process channel.

7. The water treatment apparatus of claim 1 further comprising a contaminant removal device for removing floating contaminants from the process channel.

8. The water treatment apparatus of claim 1 in which the influent water delivery arrangement comprises four delivery outlets positioned near the front wall and the bottom wall in the front region of the clarifying portion of the process channel, a first pair of the delivery outlets facing in opposite directions for delivering a first portion of the influent water laterally towards respective side walls, and a second pair of delivery outlets spaced apart from the first pair, the second pair of delivery outlets facing in opposite directions for delivering a second portion of the influent water laterally towards the respective side walls, the spaced apart first and second pairs of delivery outlets for laterally spreading out the delivery of the influent water into the process channel in a spaced apart manner for minimizing downward currents of the influent water within the process channel to allow the contaminants to more readily float to the surface of the influent water with the aid of the dissolved air within the clarifying portion of the process channel in the front region.

9. The water treatment apparatus of claim 1 in which the front wall of the process channel includes an angled portion connected to the bottom wall for directing the influent water delivered to the front region of the process channel in upward and downstream directions.

10. A water treatment apparatus comprising:

an influent water delivery arrangement for delivering influent water containing contaminants and dissolved air;

an elongate process channel for receiving the influent water containing the contaminants and the dissolved air from the influent water delivery arrangement, for floating the contaminants with the dissolved air to separate the influent water into a layer of the contaminants floating over cleaned water, the process channel extending along a horizontal longitudinal central axis and having a clarifying portion with a front region with a front wall, a bottom wall, two opposing side walls and a rear region with a rear wall, separation of the influent water initiating near the front region of the clarifying portion of the process channel and progressing moving downstream toward the rear region;

at least one baffle assembly positioned within the clarifying portion of the process channel downstream from the influent water delivery arrangement, the at least one baffle assembly comprising two elongate baffle members positioned horizontally at a midlevel height of the process channel above the central axis and extending at angles from opposite side walls in a lengthwise direction of the process channel and the central axis crossing each other in a horizontal X configuration, each elongate baffle member having an elongate horizontal surface for minimizing downward currents of the influent water in the clarifying portion of the process channel to allow the contaminants to readily float to the surface of the influent water; and a cleaned water outlet arrangement comprising at least three laterally spaced apart outlet conduits extending through the rear wall of the clarifying portion of the process channel near the bottom wall, each outlet conduit having an elongate intake opening extending along a bottom of the outlet conduit facing the bottom wall for intaking cleaned water upwardly from the bottom wall into the outlet conduit, the cleaned water outlet arrangement spreading cleaned water intake into the at least three laterally spaced apart outlet conduits along a longitudinal length and a spaced apart lateral width for minimizing downward currents of the influent water within the clarifying portion of the process channel, each outlet conduit including an outtake opening extending through the rear wall of the clarifying portion of the process channel and having flow control for controlling flow of the cleaned water from the clarifying portion of the process channel, the outlet conduits deliver the cleaned water from the clarifying portion of the process channel into a cleaned water reservoir, the cleaned water reservoir having a discharge exit arrangement at a discharge height that is elevated in height relative to the outtake openings of the outlet conduits.

11. A method of treating water with a water treatment apparatus comprising:

delivering influent water containing contaminants and dissolved air into an elongate process channel with an influent water delivery arrangement;

floating the contaminants with the dissolved air within the process channel to separate the influent water into a layer of the contaminants floating over cleaned water, the process channel extending along a horizontal longitudinal central axis and having a clarifying portion with a front region with a front wall, a bottom wall, two opposing side walls and a rear region with a rear wall, separation of the influent water initiating near the front region of the clarifying portion of the process channel and progressing moving downstream toward the rear region with at least one baffle assembly positioned within the clarifying portion of the process channel downstream from the influent water delivery arrangement, the at least one baffle assembly comprising two elongate baffle members positioned horizontally at a midlevel height of the process channel above the central axis and extending at angles from opposite side walls in a lengthwise direction of the process channel and the central axis crossing each other in a horizontal X configuration, each elongate baffle member having an elongate horizontal surface for minimizing downward currents of influent water in the clarifying portion of the process channel to allow the contaminants to readily float to the surface of the influent water; and removing the cleaned water from the clarifying portion of the process channel with a cleaned water outlet arrangement comprising at least two laterally spaced apart outlet conduits extending through the rear wall of the clarifying portion of the process channel near the bottom wall, each outlet conduit having an elongate intake opening extending along a bottom of the outlet conduit facing the bottom wall for intaking cleaned water upwardly from the bottom wall into the outlet conduit, the cleaned water outlet arrangement spreading cleaned water intake into the at least two laterally spaced apart outlet conduits along a longitudinal length and a spaced apart lateral width for minimizing downward currents of the influent water within the clarifying portion of the process channel.

12. The method of claim 11 in which the at least two laterally spaced apart outlet conduits comprise at least four laterally spaced apart outlet conduits.

13. The method of claim 11 in which each outlet conduit includes an outtake opening extending through the rear wall of the clarifying portion of the process channel and having flow control for controlling flow of the cleaned water from the clarifying portion of the process channel.

14. The method of claim 13 further comprising delivering the cleaned water from the clarifying portion of the process channel into a cleaned water reservoir through the outlet conduits, the cleaned water reservoir having a discharge exit arrangement at a discharge height that is elevated in height relative to the outtake openings of the outlet conduits for discharging the cleaned water from the cleaned water reservoir.

15. The method of claim 11 further comprising directing a midlevel height layer of influent water in a crossing manner while moving downstream in the clarifying portion of the process channel with an elongate upright surface of each elongate baffle member extending along an edge of the elongate horizontal surface.

16. The method of claim 15 in which the at least one baffle assembly comprises two baffle assemblies that are longitudinally spaced apart from each other within the process channel.

17. The method of claim 11 further comprising removing floating contaminants from the process channel with a contaminant removal device.

18. The method of claim 11 in which the front wall of the process channel includes an angled portion connected to the bottom wall, the method further comprising:

delivering the influent water with the influent water delivery arrangement comprising four delivery outlets positioned near the front wall and the bottom wall in the front region of the clarifying portion of the process channel, a first pair of the delivery outlets facing in opposite directions for delivering a first portion of the influent water laterally towards respective side walls, and a second pair of delivery outlets spaced apart from the first pair, the second pair of delivery outlets facing in opposite directions for delivering a second portion of the influent water laterally towards the respective side walls, the spaced apart first and second pairs of delivery outlets for laterally spreading out the delivery of the influent water into the process channel in a spaced apart manner for minimizing downward currents of the influent water within the process channel to allow the contaminants to more readily float to the surface of the influent water with the aid of the dissolved air within the clarifying portion of the process channel in the front region; and directing the influent water delivered to the front region of the process channel in upward and downstream directions with the angled portion of the front wall.

\* \* \* \* \*